UNITED STATES PATENT OFFICE.

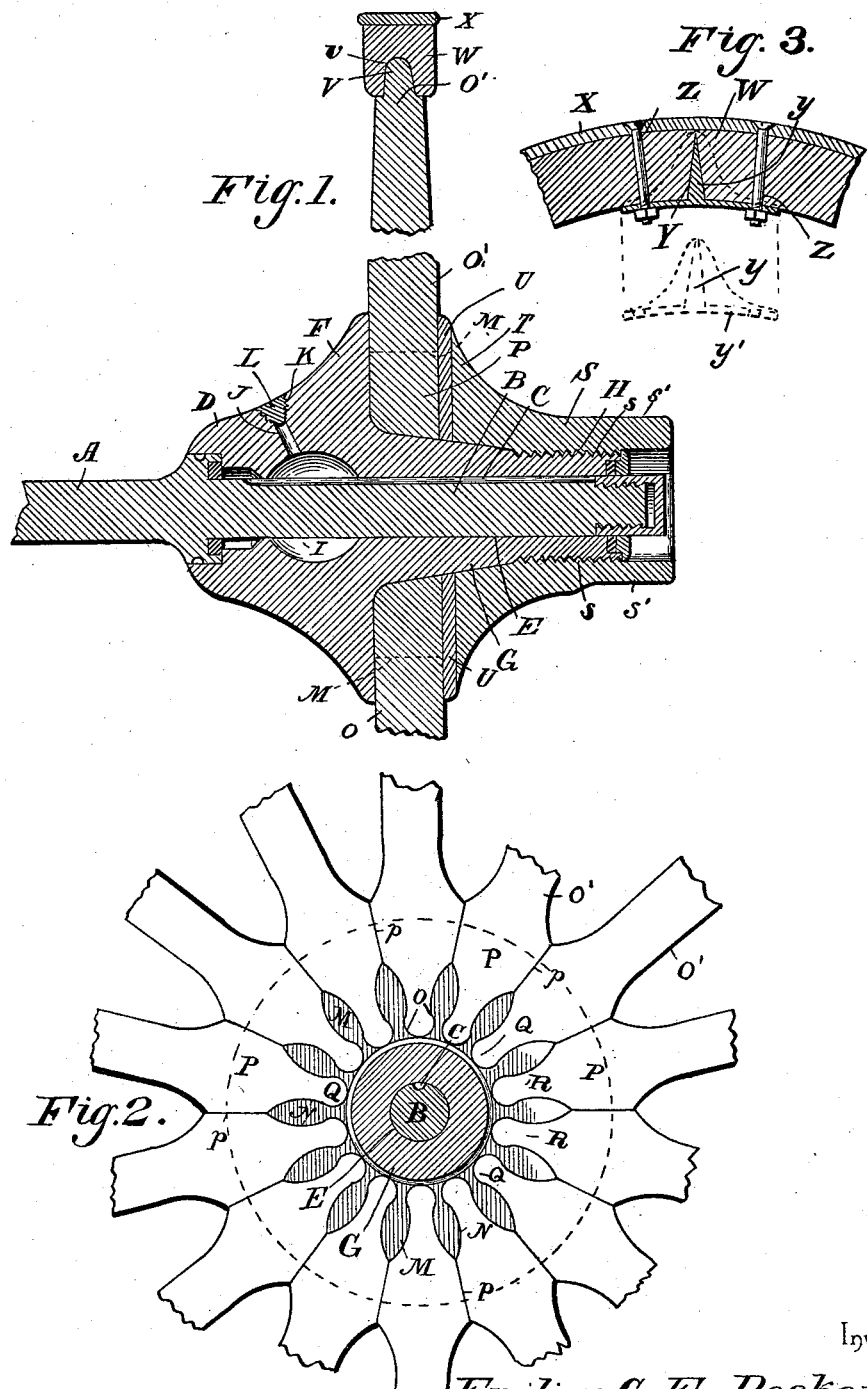

EMILIUS CHRISTIAN FERDINAND BECKER, OF MILLEDGEVILLE, GEORGIA.

VEHICLE-WHEEL.

SPECIFICATION forming part of Letters Patent No. 528,917, dated November 13, 1894.

Application filed February 21, 1894. Serial No. 501,015. (No model.)

*To all whom it may concern:*

Be it known that I, EMILIUS CHRISTIAN FERDINAND BECKER, a citizen of the United States, residing at Milledgeville, in the county of Baldwin and State of Georgia, have invented a new and useful Vehicle-Wheel, of which the following is a specification.

This invention relates to vehicle wheels; and it has for its object to effect certain improvements in separable vehicle wheels, and more especially in the hub part thereof, whereby simple and efficient means shall be provided for quickly and firmly positioning the spokes, and providing for the easy removal and replacement of the same, while at the same time constructing a hub with especial facilities for the automatic lubrication of the axle spindle.

With these and other objects in view which will readily appear as the nature of the invention is better understood, the same consists in the novel construction, combination and arrangement of parts hereinafter more fully described, illustrated and claimed.

In the drawings: Figure 1 is a vertical longitudinal sectional view of a vehicle wheel constructed in accordance with this invention. Fig. 2 is a side elevation of a portion of the wheel with the outer hub cap removed. Fig. 3 is a detail sectional view of a portion of the wheel rim showing the tightening device.

Referring to the accompanying drawings, A represents an ordinary vehicle axle provided at one end with a spindle B, which is preferably provided in the top side thereof with a longitudinal oil groove C. The axle spindle B, is adapted to accommodate thereon for rotation the inner hub member D. The inner hub member D, of the hub, is provided with an interior bore E, registering with the diameter of the spindle B, and said inner hub member D is further provided with an integral abutting flange or disk F, and a tapered neck G, extended beyond the flange or disk F, the entire length of the spindle B, and exteriorly threaded for a portion of its length as at H. The inner hub member D, as thus constructed, fits over the entire axle spindle B, and at a point near the inner end thereof is provided with an interior annular oil chamber I, communicating with the top oil groove C, of the spindle and adapted to be supplied with oil through the oil hole J, piercing the body of the inner hub member and threaded at its out end as at K, to receive the screw closure plug L, which confines the oil within the oil chamber after being filled.

At one side of the abutting flange or disk F, of the inner hub member D, is projected a circular series of mortise projections M, provided with continuous sigmoidal shaped sides N, which confine there-between and shape the mortise notches O, which by reason of the sigmoidal shaped walls are provided with widened circular portions at their bases formed partly by the taper of the neck G, and are contracted beyond said widened circular portions by the oppositely curved walls. The mortise notches O, thus described, are adapted to have detachably clamped therein the inner tenon ends P, of the wheel spokes O. The inner tenon ends P, of the wheel spokes are tapered to form the beveled abutting sides $p$, and at their inner extremities are provided with the circular tongues Q, registering in the inner circular portion of the mortise notches and above said circular tongues Q, are contracted into the necks R, which register in the space formed between the inwardly curved portions of the sigmoidal shaped walls N, and thereby complete a tenon and mortise connection of the spokes with the hubs which is extremely strong, while at the same time providing for the easy removal and replacement of the spokes.

After the spokes are positioned in the mortises of the inner hub member D, the same are firmly clamped therein by the outer removable hub cap S, interiorly threaded as at $s$, to engage the threads of the neck G, and provided at its inner end with the clamp flange T, working at one side of the washer disk or plate U, which is adapted to be clamped tight against the outer side of the spoke tenons P, to firmly hold the same in position. The outer end of the cap S, is squared as at $s'$, to receive a suitable wrench for turning the same, and the entire hub is fastened on the spindle by the usual nuts.

The wheel spokes O, are provided at their outer ends with the rounded felly tenons V, adapted to removably fit in the notches $v$, extending into the inner side of the felly W, half the width of the felly to form a secure connection therewith, and said felly is encircled by the ordinary tire X, to complete the wheel.

The main object of the present invention is to provide an improved vehicle wheel every part of which may be readily assembled and taken apart thereby rendering the wheel especially available for use on vehicles of that character which require quick repairing without resorting to a blacksmith, and to this end I also provide the felly in its inner side facing the hub at different points with the V-shaped sockets Y, which are adapted to removably and adjustably receive the V-shaped or wedge felly tightener blocks y. A V-shaped felly block y, is adapted to be fitted in a socket Y and is extended centrally from the under side of the felly clip plate y', the side flanges of which embrace the sides of the felly, and said clip plate is held firmly in position by the bolts Z, passing through the opposite ends thereof, the felly and the tire. The tire is made the exact size of the felly and after fitting the felly inside of the tire, the plates y', with the blocks y, are positioned and after being clamped in position are secured tightly onto the felly by the bolts Z, which will provide means for tightening the tire on the felly as tight as if shrunk thereon in the ordinary way.

In the event of the tire loosening, a metallic washer plate may be interposed between the clip plates and felly in order to compensate for the looseness of the tire, and by then adjusting the bolts Z, the tire may be tightened as before, and in retightening the tire in this manner, if the spokes should become loose at their connection with the felly, suitable washers may be fitted into the spoke notches v. At this point especial attention is directed to the utility of the mortises having sigmoidal shaped rounded sides, in distinction from that class of sectional wheel hubs employing squared and angular mortise projections, which necessarily present sharp edges or corners to the spoke tenons, so that when any undue strain is placed on the spokes the same bind or fulcrum on said sharp edges or corners and are therefore very often easily broken. In the present invention, the sigmoidal shaped rounded walls of the mortises present no sharp edges or corners on which the spoke tenons can fulcrum, while at the same time providing means whereby the tenon ends of the spokes can closely abut together so as to be firmly braced, and also serving to securely and tightly lock the spoke tenons within the hub so that any one spoke can be removed and replaced without disturbing the other spokes or any other part of the wheel. In addition to this important advantage for the specifically shaped mortises for the spoke tenons, it is to be further noted that the tapered neck G, forms tapered bases for the mortises, and inasmuch as the inner ends of the spokes are tapered to correspond with the taper of said neck, the spoke tenons have a driving wedge fit within the mortises, whereby the same are firmly and tightly retained in the hub without the possibility of loosening in any degree therein.

Having thus described the invention, what is claimed, and desired to be secured by Letters Patent, is—

1. In a vehicle wheel, the combination of the inner hub member provided with an abutting flange or disk, a tapered neck G, projected from said flange or disk and exteriorly threaded from an intermediate point to the outer end thereof, and a series of rounded mortises projected from the inner side of the flange or disk and surrounding the tapered neck, said tapered neck forming the base of said mortises, the wheel spokes having inner rounded tenon ends beveled or tapered to correspond to the taper of said neck and adapted to have a wedging fit in said mortises, and the removable cap, substantially as set forth.

2. In a vehicle wheel, the combination of the inner hub member provided with an integral abutting flange or disk, a tapered neck G, exteriorly threaded for a portion of its length, and a circular series of mortise projections projected from the inner side of said flange or disk, joining with said tapered neck, and provided with continuous rounded sigmoidal shaped sides forming therebetween mortise notches having widened circular portions at their bases formed partly by the tapered neck, and contracted spaces formed between the inwardly curved portions of the sides, the wheel spokes having inner beveled abutting tenon ends correspondingly shaped to said mortise notches and having a registering wedging fit therein, and a removable hub cap engaging the threaded portion of said neck and working at one side of the spoke tenons, substantially as set forth.

In testimony that I claim the foregoing as my own I have hereto affixed my signature in the presence of two witnesses.

EMILIUS CHRISTIAN FERDINAND BECKER.

Witnesses:
HENUING G. GRIEVE,
BEN. J. FOWLER.